United States Patent [19]

Kaneko

[11] Patent Number: 4,603,467

[45] Date of Patent: Aug. 5, 1986

[54] METHOD OF MANUFACTURING CHIP-TYPE ALUMINUM ELECTROLYTIC CAPACITOR

[75] Inventor: Shinichi Kaneko, Nagai, Japan

[73] Assignee: Marcon Electronics Co., Ltd., Nagai, Japan

[21] Appl. No.: 733,260

[22] Filed: May 13, 1985

[30] Foreign Application Priority Data

May 25, 1984 [JP] Japan .............................. 59-107045
May 25, 1984 [JP] Japan .............................. 59-107046

[51] Int. Cl.⁴ ............................................. H01G 9/00
[52] U.S. Cl. ................................................... 29/570
[58] Field of Search ........................................ 29/570

[56] References Cited

U.S. PATENT DOCUMENTS

| | | | |
|---|---|---|---|
| 3,618,200 | 11/1971 | Matsuo et al. ................... | 29/570 |
| 4,266,332 | 3/1981 | Markarian et al. ............... | 29/570 |
| 4,267,565 | 3/1981 | Puppolo et al. .................. | 361/433 |
| 4,267,566 | 3/1981 | Moresi, Jr. ....................... | 361/433 |
| 4,288,842 | 9/1981 | Vorles .............................. | 29/570 |
| 4,439,810 | 3/1985 | Shimada et al. .................. | 361/272 |

*Primary Examiner*—R. L. Andrews
*Attorney, Agent, or Firm*—Oblon, Fisher, Spivak, McClelland & Maier

[57] ABSTRACT

In a method of manufacturing a compact and lightweight chip-type aluminum electrolytic capacitor, thin external leads are welded to flat anode and cathode foils. The anode and cathode foils are superposed with an insulating spacer interposed therebetween. The portion between the anode and cathode foils is impregnated with an electrolytic solution to obtain a capacitor element. The two surfaces of the capacitor element are covered with synthetic resin laminate films. The openings of the laminate films are welded and sealed to complete the capacitor.

12 Claims, 12 Drawing Figures

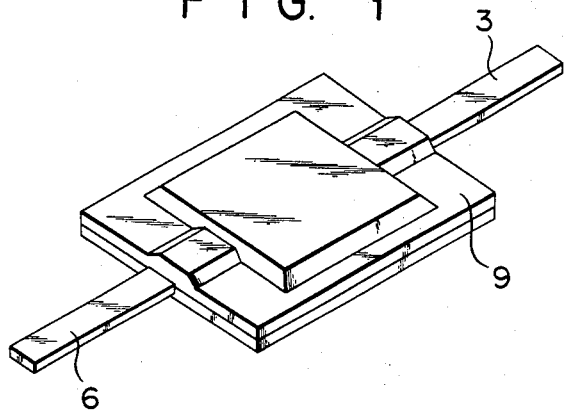
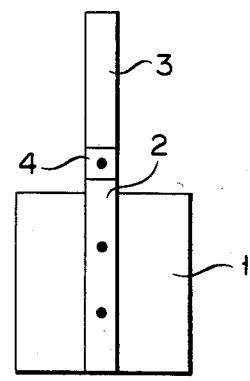
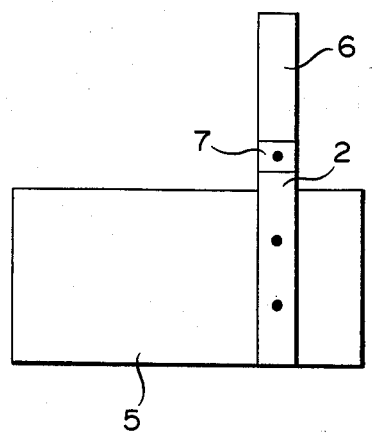
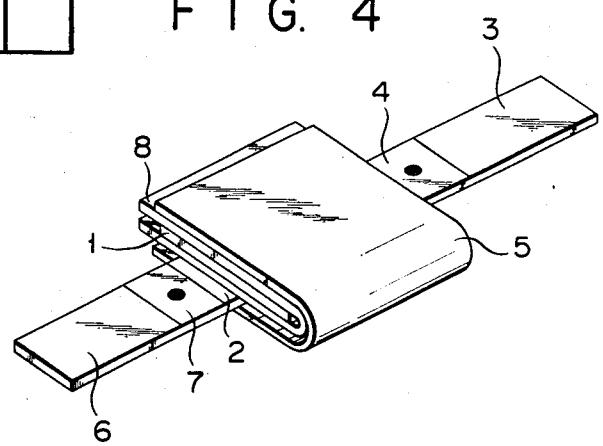

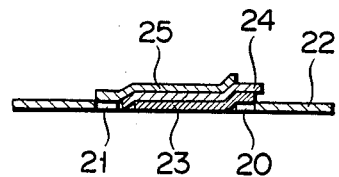
FIG. 9
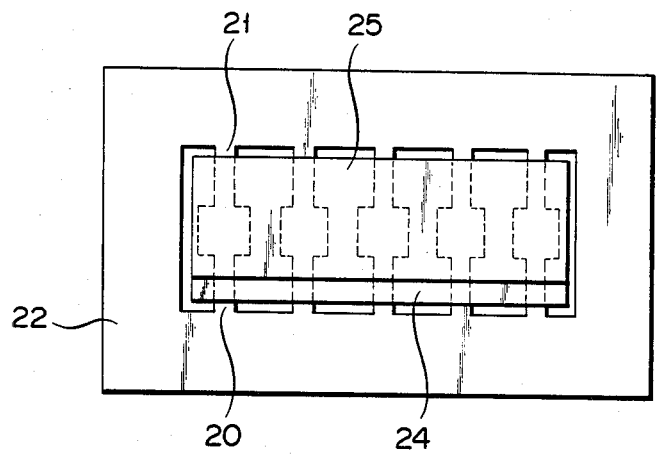
FIG. 10
FIG. 11
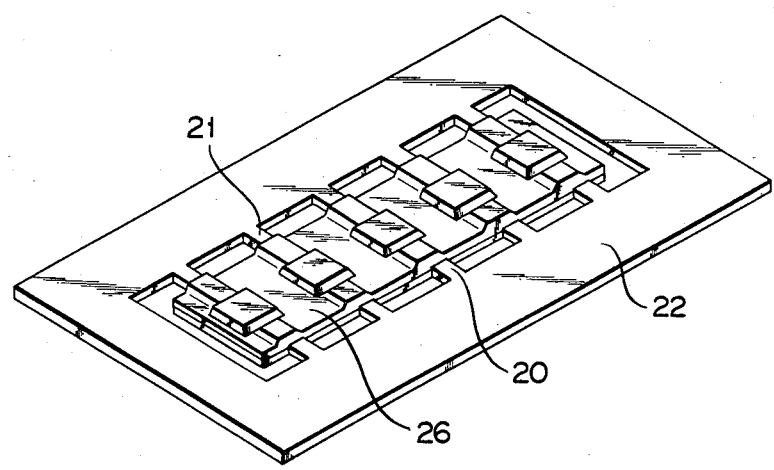

METHOD OF MANUFACTURING CHIP-TYPE ALUMINUM ELECTROLYTIC CAPACITOR

BACKGROUND OF THE INVENTION

The present invention relates to a method of manufacturing a chip-type aluminum electrolytic capacitor and, more particularly, to a method of manufacturing a chip-type aluminum electrolytic capacitor in which a flat capacitor element is packaged integrally with a synthetic resin laminate film and has a very small capacitance and small size and weight.

In a conventional chip-type aluminum electrolytic capacitor of the type described above, anode and cathode foils having anode and cathode lead wires connected thereto are cylindrically wound through an insulating spacer to form the capacitor element. The capacitor element is stored in a synthetic resin case with impregnation holes. An electrolytic solution is injected through the impregnation holes and thereafter the holes are closed. External leads are connected to the anode and cathode lead wires. The case is encapsulated in a synthetic resin capsule while the respective external leads are exposed.

In another conventional chip-type aluminum electrolytic capacitor, a capacitor element similarly obtained by cylindrically winding anode and cathode foils through an insulating spacer is housed in a cylindrical aluminum case. After impregnation with an electrolytic solution, the opening of the case is sealed with a rubber stopper. External leads are welded to anode and cathode lead wires. The case and the rubber stopper are encapsulated in a synthetic resin capsule while the external terminals are exposed.

However, with the chip-type aluminum electrolytic capacitor manufactured by the former method, the anode and cathode foils are wound through an insulating spacer. Therefore, the outer shape becomes cylindrical and the thickness of the chip-type aluminum electrolytic capacitor after forming a synthetic resin capsule is increased. In this case, according to one method, after anode and cathode foils are cylindrically wound through an insulating spacer, the obtained assembly is pressed into a flat shape. After impregnating the flat assembly with an electrolytic solution, it is encapsulated in a synthetic resin capsule. However, even with this method, the thickness of the capacitor after forming the capsule cannot be decreased beyond a certain extent. Thus, since the conventional chip-type aluminum electrolytic capacitor has a large thickness, the overall volume is increased. Therefore, the conventional chip-type aluminum electrolytic capacitor cannot be rendered lightweight and compact. In addition in the conventional chip-type aluminum electrolytic capacitor described above, since the electrode foils are wound cylindrically, they must have a certain length. That is, the length of the electrode foils cannot be reduced below a minimum limit required for the cylindrical winding operation. When the chip-type aluminum electrolytic capacitor must satisfy ratings for a low-voltage and small-capacitance capacitor, the formation voltage of the anode foil is intentionally increased to increase the area of the electrode foil, thereby making the winding operation easier. According to this method of manufacturing a chip-type aluminum electrolytic capacitor, the minimum size, length or weight that can be achieved is limited.

In addition to the conventional chip-type aluminum electrolytic capacitors described above, after electrode foils and an insulating spacer are cylindrically wound, the assembly is pressed flat. After impregnating the pressed assembly with an electrolytic solution, it is covered with a synthetic resin laminate film and the lead wires are left exposed. The laminate film is melted and sealed by heating or ultrasonic welding so as to provide a chip-type aluminum electrolytic capacitor. However, with this conventional method, since the electrode foils and the insulating spacer are cylindrically wound and thereafter the assembly is pressed flat, similar problems are encountered as with the former methods. The minimum size attainable with this method is 6 mm×6 mm×2.5 mm. A smaller and thinner capacitor element cannot be obtained.

SUMMARY OF THE INVENTION

It is an object of the present invention to provide a method of manufacturing a chip-type aluminum electrolytic capacitor which allows manufacture of a compact and lightweight chip-type aluminum electrolytic capacitor.

It is another object of the present invention to provide a method of manufacturing a chip-type aluminum electrolytic capacitor having low voltage and very low capacitance ratings.

It is still another object of the present invention to provide a method of manufacturing a chip-type aluminum electrolytic capacitor which is suitable for mass-production.

In order to achieve the above objects of the present invention, there is provided a method of manufacturing a chip-type aluminum electrolytic capacitor, comprising the steps of:

welding one conductive thin external lead to one flat electrode foil;

covering a foil surface of at least the one flat electrode foil with an insulating spacer;

welding the other conductive thin external lead to the other flat electrode foil;

covering an upper surface of the insulating spacer with the other flat electrode foil and superposing the other flat electrode foil on the one flat electrode foil through the insulating spacer to provide a capacitor element;

impregnating the capacitor element with an electrolytic solution; and covering and integrally sealing the foil surfaces of at least the one and the other flat electrode foils with a synthetic resin insulating laminate film.

According to another aspect of the present invention, there is provided a method of manufacturing a chip-type aluminum electrolytic capacitor, comprising the steps of:

forming in a common lead frame a plurality of pairs of conductive thin external leads projecting toward each other;

welding one flat electrode foil to one external lead of each of the pairs of conductive thin external leads;

covering a foil surface of at least the one flat electrode foil with an insulating spacer;

welding the other flat electrode foil to the other external lead of each of the pairs of conductive thin external leads;

covering an upper surface of the insulating spacer with the other flat electrode foil and superposing the other flat electrode foil on the one flat electrode foil through the insulating spacer;

cutting the flat electrode foils and the insulating spacer for each of the plurality of pairs of conductive thin external leads to provide a plurality of capacitor elements;

impregnating each of the plurality of capacitor elements with an electrolytic solution;

covering and integrally sealing foil surfaces of at least the one and the other flat electrode foils of the capacitor elements with a synthetic resin insulating laminate film;

cutting the laminate film for each of the plurality of capacitor elements; and separating the external leads from the lead frame.

BRIEF DESCRIPTION OF THE DRAWINGS

FIG. 1 is a perspective view showing the structure of a chip-type aluminum electrolytic capacitor manufactured by a method according to an embodiment of the present invention;

FIG. 2 is a plan view showing the structure wherein an extending piece and an external lead are connected to an anode foil shown in FIG. 1;

FIG. 3 is a plan view showing the structure wherein an extending piece and an external lead are connected to a cathode foil shown in FIG. 1;

FIG. 4 is a perspective view showing the structure wherein a laminate film shown in FIG. 1 is removed;

FIG. 9 is a sectional view showing the arrangement of the anode foil, the cathode foil, and the insulating spacer in the method of the second embodiment of the present invention;

FIG. 10 is a plan view showing a state wherein the respective capacitors are cut into pieces of a prescribed size in the method of the second embodiment of the present invention; and FIG. 11 is a perspective view showing a state wherein the respective capacitor elements are sealed with a laminate film in the method of the second embodiment of the present invention and FIG. 12 is a perspective view of a state wherein each external lead of each capacitor element sealed with a laminate film in method of a second embodiment of the present invention is separated from the lead frame.

DETAILED DESCRIPTION OF THE PREFERRED EMBODIMENTS

Figure 5:
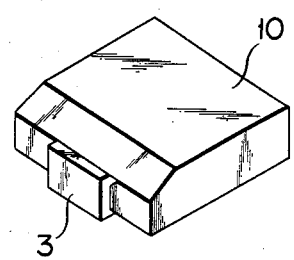
FIG. 5 is a perspective view showing the structure wherein the chip-type aluminum electrolytic capacitor shown in FIG. 1 is encapsulated in a synthetic resin capsule.

A method according to a first embodiment of the present invention will be exemplified with the manufacture of a chip-type aluminum electrolytic capacitor having ratings of 50 WV and 0.068 μF or less.

As shown in FIG. 2, an extending piece 2 having a thickness of 0.1 mm is welded to one flat electrode foil prepared through a formation at 70 V and having a size of 1 mm×1 mm×0.1 mm, e.g., an anode foil 1. A thin external lead 3 of nickel silver having a thickness of 0.1 mm is welded to the extending piece 2. The welded portion is covered with a synthetic resin 4. When the welded portion is covered with a synthetic resin in this manner, short-circuiting due to the presence of welding flashes or corrosion upon contact with an electrolytic solution can be prevented. A thin external lead 6 identical to lead 3 is welded to the other flat electrode foil 5 having an area twice that of the anode foil 1, i.e., a size of 1 mm×2 mm×0.1 mm, i.e., a cathode foil 5, as shown in FIG. 3. The welded portion is covered with a synthetic resin 7. As shown in FIG. 4, the two surfaces of the anode foil 1 are covered with insulating spacers 8 each having an area slightly larger than that of the anode foil 1. The outer surfaces of the insulating spacers 8 are covered with the folded cathode foil 5 such that the anode and cathode foils 1 and 5 overlap each other through the insulating spacers 8. In this state, an electrolytic solution is dropped between the anode and cathode foils 1 and 5, or the assembly is dipped in an electrolytic solution to form a capacitor element. As shown in FIG. 1, the two surfaces of the capacitor element are sandwiched within a folded synthetic insulating laminate film 9. While the thin external leads 3 and 6 are exposed, the openings of the laminate film 9 are welded and sealed by heating or ultrasonic welding. The laminate film 9 can, for example, be a three-layered laminate film consisting of a polyester film of 0.01 mm thickness, an aluminum foil of 0.02 mm thickness and an ionomer resin film of 0.15 mm thickness. The chip-type aluminum electrolytic capacitor manufactured by the method of the present invention described above has a size of 3.0 mm×2.5 mm×0.7 mm.

When the capacitor element is encapsulated with a synthetic resin after being sealed with the laminate film 9, it is placed in a mold for plastic encapsulation. As shown in FIG. 5, a synthetic resin capsule of 0.5 mm thickness is formed. The leads 3 and 6 are bent toward the bottom surface to provide a plastic encapsulated chip-type aluminum electrolytic capacitor. The plastic encapsulated chip-type aluminum electrolytic capacitor obtained in this manner had a size of 4.0 mm×3.3 mm×1.5 mm. In contrast to this, a chip-type aluminum electrolytic capacitor according to the prior art technique but having the same ratings as those of the present invention was prepared. In the case of the prior art technique, when the conventional cylindrically wound capacitor element as described earlier was contained in a resin case and encapsulated in a synthetic resin capsule of 0.5 mm thickness, the chip-type aluminum electrolytic capacitor had a size of 6.5 mm×4.5 mm×2.5 mm. Thus, it can be seen that the capacitor manufactured by the method of the present invention has a very small size as compared to that of the conventional techniques.

In accordance with the method of the present invention, another chip-type aluminum electrolytic capacitor of ratings of 50 WV and 0.22 μF was prepared under conditions where the anode foil 1 had a size of 2 mm×2 mm×0.1 mm. In this case, the chip-type aluminum electrolytic capacitor prepared by this method had a size of 6.0 mm×5.0 mm×1.5 mm. In contrast to this, the chip-type aluminum electrolytic capacitor obtained by the method of the conventional techniques had a same size of 6.5 mm×4.5 mm×2.5 mm as in the case of a capacitor having ratings of 50 WV and 0.068 μF.

In the case of a chip-type aluminum electrolytic capacitor having ratings of 50 WV and 0.47 μF, the anode foil of the capacitor prepared by the method of the present invention had a size of 3 mm×3 mm×0.1 mm, and the capacitor had a size of 6.5 mm × 5.5 mm × 1.5 mm. However, a chip-type aluminum electrolytic capacitor of the same ratings and prepared by a conventional method had a size of 6.5 mm × 4.5 mm × 2.5 mm as in the case of a capacitor having ratings of 50 WV and 0.068 μF. When a cylindrically wound capacitor element is not pressed flat but is directly contained in a cylindrical aluminum case, sealed with a rubber stopper and plastic-encapsulated, the resultant capacitor has a bigger size.

Figure 6:
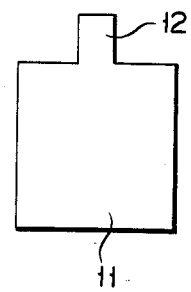
FIG. 6 is a plan view showing another example of an anode foil used in the method of the present invention.
Figure 7:
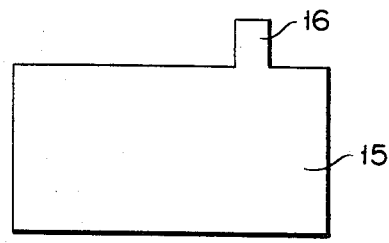
FIG. 7 is a plan view showing another example of a cathode foil used in the method of the present invention.

According to the method of the embodiment described above, the extending pieces 2 are welded to the anode and cathode foils 1 and 5, and the thin external leads 3 and 6 are welded to the extending pieces 2. However, alternatively, as shown in FIG. 6 and FIG. 7, an extending portion 12 can be formed in an anode foil 11 as shown in FIG. 6, and an extending portion 16 can be formed in a cathode foil 15 as shown in FIG. 7, and the thin external leads 3 and 6 can be directly welded to the extending portions 12 and 16. In the method of the embodiment of the present invention described above, the cathode foil 5 is folded and is superposed on the anode foil 1 through the insulating spacers 8. However, a plurality of anode foils, insulating spacers and cathode foils can be folded and superposed.

Table 1 below shows a comparison of the respective dimensions (volume) of chip-type aluminum electrolytic capacitors of respective ratings prepared by the method of the present invention and the prior art method. As can be seen from Table 1, according to the method of the present invention, the chip-type aluminum electrolytic capacitor can be rendered smaller and lighter than the one prepared by the prior art method. Thus, the method of the present invention can render the capacitor compact in size and light in weight, and particularly small in thickness. When the capacitor is mounted on a substrate as a chip component, if soldering is performed by a flow method, stable soldering can be achieved due to a small height. According to the method of the present invention, since external leads welded to the respective anode and cathode foils 1 and 5 comprise the thin external leads 3 and 6, the laminate film 9 can provide a complete seal. Since the external leads are flat and thin, they do not break the laminate film, unlike the round lead wires used in the conventional capacitors. Hence, the capacitors made by the method of this invention are not short-circuited.

TABLE 1

| Ratings | External size (mm); Volume in parentheses (mm³) | |
|---|---|---|
| | Present invention | Conventional method |
| 50 WV– 0.068 μF | 4 × 3.3 × 1.5 (19.8) | 6.5 × 4.5 × 2.5 (73.1) |
| 50 WV– 0.22 μF | 6 × 5 × 1.5 (45.0) | 6.5 × 4.5 × 2.5 (73.1) |
| 50 WV– 0.47 μF | 6.5 × 5.5 × 1.5 (53.6) | 6.5 × 4.5 × 2.5 (73.1) |

A method according to a second embodiment of the present invention will now be described with reference to FIGS. 8 to 12.

Figure 12:
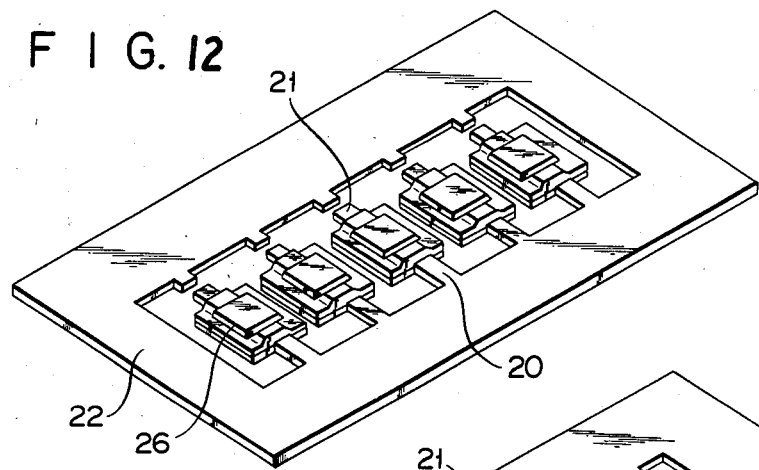
Figure 8:
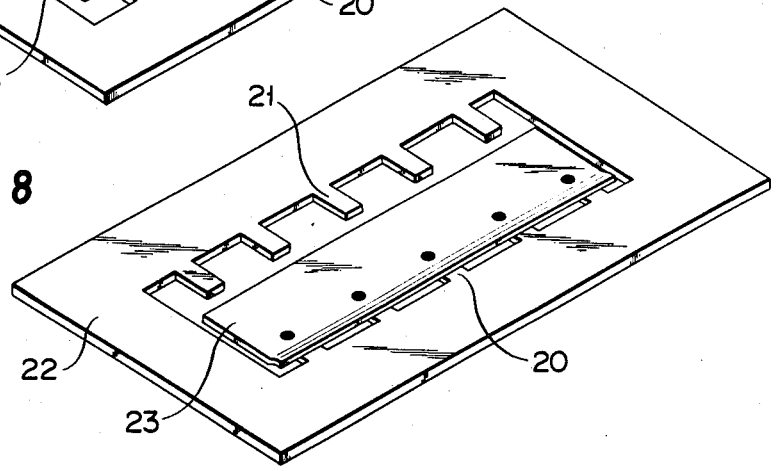
FIG. 8 is a perspective view of a state wherein anode foils are welded to the respective external leads of the lead frame in the method of the second embodiment of the present invention.

As shown in FIG. 8, a nickel silver plate having a thickness of, for example, 0.1 mm was punched to form a plurality of pairs of thin external leads 20 and 21 in a common lead frame 22. Each external lead 20 or 21 had a width of, e.g., 0.6 mm, and the distance between the distal ends of the opposing external leads 20 and 21 was set to be 1.5 mm. An anode foil 23 having a width of 2 mm was superposed on the upper surface of one of the external leads 20 and 21 of each pair, e.g., the external lead 20. Each superposed portion is welded by electric, laser or ultrasonic welding. Each welded portion and the distal end of each external lead 20 are coated with a resin to cover flashes formed in the welded portion and to prevent corrosion of the distal end upon contact with an electrolytic solution. Then, the upper surface of the anode foil 23 is covered with an insulating spacer 24 such as insulating paper, as shown in FIG. 9. The upper surface of the insulating spacer 24 and that of each external lead 21 are covered with a cathode foil 25. The overlapping portion between each cathode foil 25 and the corresponding external lead 21 is welded in the same method as described above. Each welded portion and the distal end of each external lead 21 are coated with a synthetic resin. After superposing the anode foil 23, the insulating spacer 24 and the cathode foil 25 in this manner, as shown in FIG. 10. The anode foil 23, the insulating spacer 24 and the cathode foil 25 are cut with a cutting mold into cut portions having a size of 1 mm × 1 mm (dashed lines in FIG. 10) so that each cut portion has the external leads 20 and 21 at the center, thereby providing a plurality of capacitor elements. In this case, each capacitor element is fixed to the lead frame 22 by the external leads 20 and 21. The insulating spacer of each capacitor element is impregnated with an electrolytic solution which is, dropped onto it, for example. Then, as shown in FIG. 11, each capacitor element is sandwiched between three-layered laminate films 26 consisting of a polyester film of 0.01 mm thickness, an aluminum foil of 0.02 mm thickness and an ionomer resin film of 0.15 mm thickness. The laminate films surrounding each capacitor element including the external leads 20 and 21 are welded and sealed by heating or ultrasonic welding. After sealing, the unnecessary portion of the laminate film 26 and one of each pair of external leads 20 and 21, for example, the external lead 21 are punched from the lead frame 22 by a punching mold or the like, thereby providing the capacitor element as shown in FIG. 12. Each capacitor element shown in FIG. 12 is subjected to necessary steps such as ageing or characteristics test. Thereafter, the external leads 20 connected to the lead frame 22 are cut therefrom so as to provide a chip-type aluminum electrolytic capacitor having the same structure as that shown in FIG. 1. The capacitor can be plastic-encapsulated as shown in FIG. 5 as in the case of the first embodiment. The chip-type aluminum electrolytic capacitor prepared in the second embodiment had the same characterstics as those of the capacitor prepared in the first embodiment. When the forming voltage of the anode foil 23 was 70 V, a compact chip-type aluminum electrolytic capacitor having ratings of 50 WV and 0.047 μF with an external size of 2.5 mm × 3.0 mm × 0.7 mm was obtained.

The laminate film 9 or 26 used in the embodiments described above can be a laminate film of synthetic resin films or a laminate film of a synthetic resin film and a metal foil. When a laminate film of synthetic resin films only is used, the film which contacts the capacitor side preferably comprises a thermoplastic ionomer resin providing a good weldability with the external leads and between the respective films. When a laminate film of a synthetic resin film and a metal foil is used, the two surfaces of the metal foil are preferably sandwiched between synthetic resin films.

In the embodiments described above, nickel silver plates are used for the external leads 3 and 6, and the lead frame 22. However, the external leads and the lead frame can comprise any thin metal plate capable of being soldered and can therefore comprise thin metal films of, for example, Ni, Fe or Cu.

In the above embodiments, after the anode foil, insulating spacer and the cathode foil are superposed, it is impregnated with an electrolytic solution, dropped onto it. However, the assembly can be dipped in an electrolytic solution. Alternatively, after covering the anode foil with the insulating spacer, the portion between the anode foil and the insulating spacer can be impregnated with an electrolytic solution.

According to the second embodiment of the present invention, the chip-type aluminum electrolytic capacitor can be rendered compact in size and light in weight as in the first embodiment. In addition, chip-type aluminum electrolytic capacitors can be manufactured in units of a desired number using a lead frame, and the manufacturing process is efficient and can be easily automated.

What is claimed is:

1. A method of manufacturing a chip-type aluminum electrolytic capacitor, comprising the steps of:
    welding a first thin external lead having conductivity to a first flat electrode foil;
    covering the entire surface of the first flat electrode foil with an insulating spacer;
    welding a second thin external lead having conductivity to a second flat electrode foil;
    covering an upper surface of said insulating spacer with the second flat electrode foil, and so covering the first flat electrode foil with said second flat electrode foil, so that said insulating spacer is interposed between said first and second flat electrode foils;
    impregnating said insulating spacer with an electrolytic solution, thereby providing a capacitor element; and
    covering and integrally sealing at least said surfaces of the first and second flat electrode foils with a synthetic resin insulating laminate film.

2. A method according to claim 1, further comprising encapsulating an external surface of said laminate film with a synthetic resin capsule, after covering and sealing said surfaces of the first and the second flat electrode foils with said laminate film.

3. A method according to claim 1, further comprising encapsulating an external surface of said laminate film with a synthetic resin capsule; and thereafter bending said thin external leads toward the bottom surface of said synthetic resin capsule; after covering and sealing said surfaces of the first and the second flat electrode foils with said laminate film.

4. A method according to claim 1, wherein a welded portion between the first flat electrode foil and the second thin external lead, and a welded portion between the second flat electrode foil and the second thin external lead are respectively covered with a synthetic resin before impregnation with the electrolytic solution.

5. A method of manufacturing a chip-type aluminum electrolytic capacitor, comprising the steps of:
    forming in a common lead frame a plurality of pairs of conductive thin external leads projecting toward each other;
    welding a first flat electrode foil to a first external load of each of said pairs of conductive thin external leads;
    covering at least a surface of the first flat electrode foil with an insulating spacer;
    welding a second flat electrode foil to a second external lead of each of said pairs of conductive thin external leads;
    covering an upper surface of said insulating spacer with the second flat electrode foil the first flat electrode foil is covered with said insulating spacer;
    cutting the superposed portions of the first and the second flat electrode foils and said insulating spacer for each of said plurality of pairs of conductive thin external leads to provide a plurality of capacitor elements;
    impregnating each of said plurality of capacitor elements with an electrolytic solution;
    covering and integrally sealing at least the surfaces of the first and second flat electrode foils of said capacitor elements with synthetic resin insulating laminate film;
    cutting the sealed portion of said laminate film for each of said plurality of capacitor elements; and
    separating the first and the second external leads from said lead frame.

6. A method according to claim 5, further comprising encapsulating an external surface of said laminated film with a synthetic resin capsule, after covering and sealing said surfaces of the first and the second flat electrode foils with said laminate film.

7. A method according to claim 5, further comprising encapsulating an external surface of said laminated film with a synthetic resin capsule; and thereafter bending said thin external leads toward a bottom surface of said synthetic resin capsule; after covering and sealing said surfaces of the first and the second flat electrode foils with said laminate film.

8. A method according to claim 5, wherein welded portions between the first flat electrode foil and the second thin external leads, and welded portions between the second flat electrode foil and the second thin external leads are respectively covered with a synthetic resin before impregnation with the electrolytic solution.

9. A method of manufacturing a chip-type aluminum electrolytic capacitor, comprising the steps of:
    welding a first thin external lead having conductivity to a first electrode foil;
    covering both surfaces of the first electrode foil with an insulating spacer bent double and having first and second portions;
    welding a second thin external lead having conductivity to a second electrode foil bent double and having first and second portions;
    covering the outer surfaces of the first and second portions of the insulating spacer with the first and second portions of the second electrode foil, so that said insulating spacer is sandwiched between the first electrode foil and the second electrode foil;
    impregnating said insulating spacer with an electrolytic solution, thereby providing a capacitor element; and
    covering and integrally sealing at least the outer surfaces of the first and second portions of said second electrode foil with a synthetic resin insulating laminate film.

10. A method according to claim 9, further comprising encapsulating the outer surface of said laminate film with a synthetic resin capsule, after covering and sealing at least the outer surfaces of the first and second portions of said second electrode foil with the laminate film.

11. A method according to claim 9, further comprising encapsulating the outer surface of said laminate film with a synthetic resin capsule, and bending said thin external leads toward the bottom of the synthetic resin capsule, after covering and sealing at least the outer surfaces of the first and second portions of said second electrode foil with the laminate film.

12. A method according to claim 9, wherein a welded portion between the first electrode foil and the second thin external lead, and a welded portion between the second electrode foil and the second thin external lead are covered with a synthetic resin before the insulating spacer is impregnated with the electrolytic solution.

* * * * *